(12) United States Patent
Amzal et al.

(10) Patent No.: US 12,455,867 B2
(45) Date of Patent: *Oct. 28, 2025

(54) AUTOMATED FEATURE ENGINEERING FOR MULTIDIMENSIONAL DATA

(71) Applicant: SAP SE, Walldorf (DE)

(72) Inventors: Mokrane Amzal, Courbevoie (FR); Guillaume Lasnier, Walldorf (DE)

(73) Assignee: SAP SE, Walldorf (DE)

( * ) Notice: Subject to any disclaimer, the term of this patent is extended or adjusted under 35 U.S.C. 154(b) by 5 days.

This patent is subject to a terminal disclaimer.

(21) Appl. No.: 18/453,412

(22) Filed: Aug. 22, 2023

(65) Prior Publication Data

US 2023/0394023 A1 Dec. 7, 2023

Related U.S. Application Data

(63) Continuation of application No. 17/000,514, filed on Aug. 24, 2020, now Pat. No. 11,741,069.

(51) Int. Cl.
*G06F 16/22* (2019.01)
*G06F 16/242* (2019.01)
*G06F 18/214* (2023.01)
*G06N 20/00* (2019.01)

(52) U.S. Cl.
CPC ........ *G06F 16/2264* (2019.01); *G06F 16/221* (2019.01); *G06F 16/2272* (2019.01); *G06F 16/244* (2019.01); *G06F 18/2148* (2023.01); *G06N 20/00* (2019.01)

(58) Field of Classification Search
CPC ................................... G06F 16/2264
USPC ........................................... 707/736
See application file for complete search history.

(56) References Cited

U.S. PATENT DOCUMENTS 9,886,483 B1 * 2/2018 Harrison ................. G06F 16/28
2017/0316052 A1 * 11/2017 Marin ................. G06F 16/2452

\* cited by examiner

*Primary Examiner* — Syling Yen
(74) *Attorney, Agent, or Firm* — Buckley, Maschoff & Talwalkar LLC

(57) ABSTRACT

Provided is a system and method for automated feature engineering of multidimensional data. The system and method may generate a flat data set for use in training a machine learning model from a multidimensional data set. In one example, the method may include extracting metadata of multidimensional data, generating declarative statements of features that are to be derived from the multidimensional data based on hierarchical attributes of the multidimensional data which are identified from the extracted metadata, querying, via a query engine, the multidimensional data based on the generated declarative statements to generate the derived features, and storing the derived features in a training data set.

20 Claims, 8 Drawing Sheets

AUTOMATED FEATURE ENGINEERING FOR MULTIDIMENSIONAL DATA

CROSS-REFERENCE TO RELATED APPLICATIONS

The present application is a continuation of U.S. patent application Ser. No. 17/000,514, which was filed on Aug. 24, 2020, in the United States Patent and Trademark Office, the entire disclosure of which is hereby incorporated by reference for all purposes.

BACKGROUND

Feature engineering is a process of constructing explanatory variables (i.e., features) from one or more datasets (raw data) which can be used to train a machine learning model for solving a prediction problem. Machine learning typically requires a single table (i.e., in two dimensions) for training. Therefore, feature engineering requires consolidating the features into a single table that can be used for training. Automated feature engineering improves upon a standard machine learning workflow by automatically extracting useful and meaningful features from a set of related data tables with a framework that can be applied to any problem. Automated feature engineering not only cuts down on the time spent feature engineering, but creates interpretable features and prevents data leakage by filtering time-dependent data. In some cases, automated feature engineering can identify hundreds or even thousands of possible features (and tables) for use in training a model. However, this process is not applicable to a multi-dimensional data model which includes three dimensions or more.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Machine learning is a field of artificial intelligence that uses statistical techniques to give computer systems the ability to learn from data without being explicitly programmed. The learning process may be progressive in that the learning improves the more times that the machine learning algorithm(s) is trained. Feature engineering is the process of using domain knowledge of data to create features that help machine learning algorithms learn. Features are fed into the machine learning algorithm which are then executed on the feature data thereby training the machine learning model based on the content of the features. Feature engineering is fundamental to the application of machine learning, and is both difficult and expensive. In many cases, features are identified by a subject matter expert (i.e., a human) sifting through large amounts of data and making manual selections of the features.

Multidimensional data (also referred to as multidimensional models) are data models in which the data is organized into measures or facts (e.g., some quantity of numerical data, etc.) and multiple dimensions (characteristics of the data) which may include three or more dimensions. As a non-limiting example, a number of products sold may be a measure and the dimensions may include time of sale, region where the sale occurred, product type of the item, store location where the product was sold, etc. The measures are typically numerical values that can be aggregated using different aggregation functions (SUM, COUNT, MIN, MAX, DISTINCT COUNT, AVERAGE, etc.). Meanwhile, dimensions describe the data and may be organized into hierarchies. For example, hierarchies can include parent-child hierarchies where a data item can be sub-divided into a plurality of smaller categories (e.g., an employee category may have one manager that breaks down into five assistant managers, where each of the assistant managers is considered a child level of the manager level, etc.) Therefore, choosing the features for a given multidimensional data model can be exponentially more difficult than choosing the features for a two-dimensional data set since there are more dimensions of data.

The example embodiments are directed to a system which can automatically engineer features from multidimensional data models and store such features in a flat format (tabular data format) that can be fed into a machine learning algorithm. The derived features may be referred to as a predictive data set. Attributes of the multidimensional data such as dimensions, measure types, aggregation functions, hierarchies in the dimensions, and the like, may be stored within metadata of the multidimensional data model. The system may extract the attributes from the metadata, and use the attributes to generate a query generation plan which includes informal descriptions (e.g., declarative statements) of features that are to be returned from the multidimensional data model. The informal descriptions may identify the measure, the dimensions, and the hierarchies in the dimensions which are to be queried. The informal descriptions may also include pivots about certain dimensions (e.g., sales from two specific regions, sales during a specific period of time, etc.)

The system may convert the informal statements within the query generation plan into formal query syntax that can be used by a query engine to query a multidimensional model. Examples of a query engine include an Online Analytical Processing (OLAP) engine, SAP's HANA database, and the like. Meanwhile, an example of the query syntax may be Multidimensional Expressions (MDX) which is a language for querying multidimensional data that is stored in OLAP cubes. The query engine/processor may execute the multidimensional queries to return flat data in tabular format. For example, a feature may be a column of data. Thus, a plurality of features may be a plurality of columns. The features may be added to a single data table or multiple data tables and stored for use during training of a machine learning algorithm. In some embodiments, the machine learning algorithm (e.g., regression, classification, neural network, etc.) may be trained from the generated features. Accordingly, the system can automatically engineer features from multidimensional data rather than require a user to specify features that are to be engineered.

Figure 1:
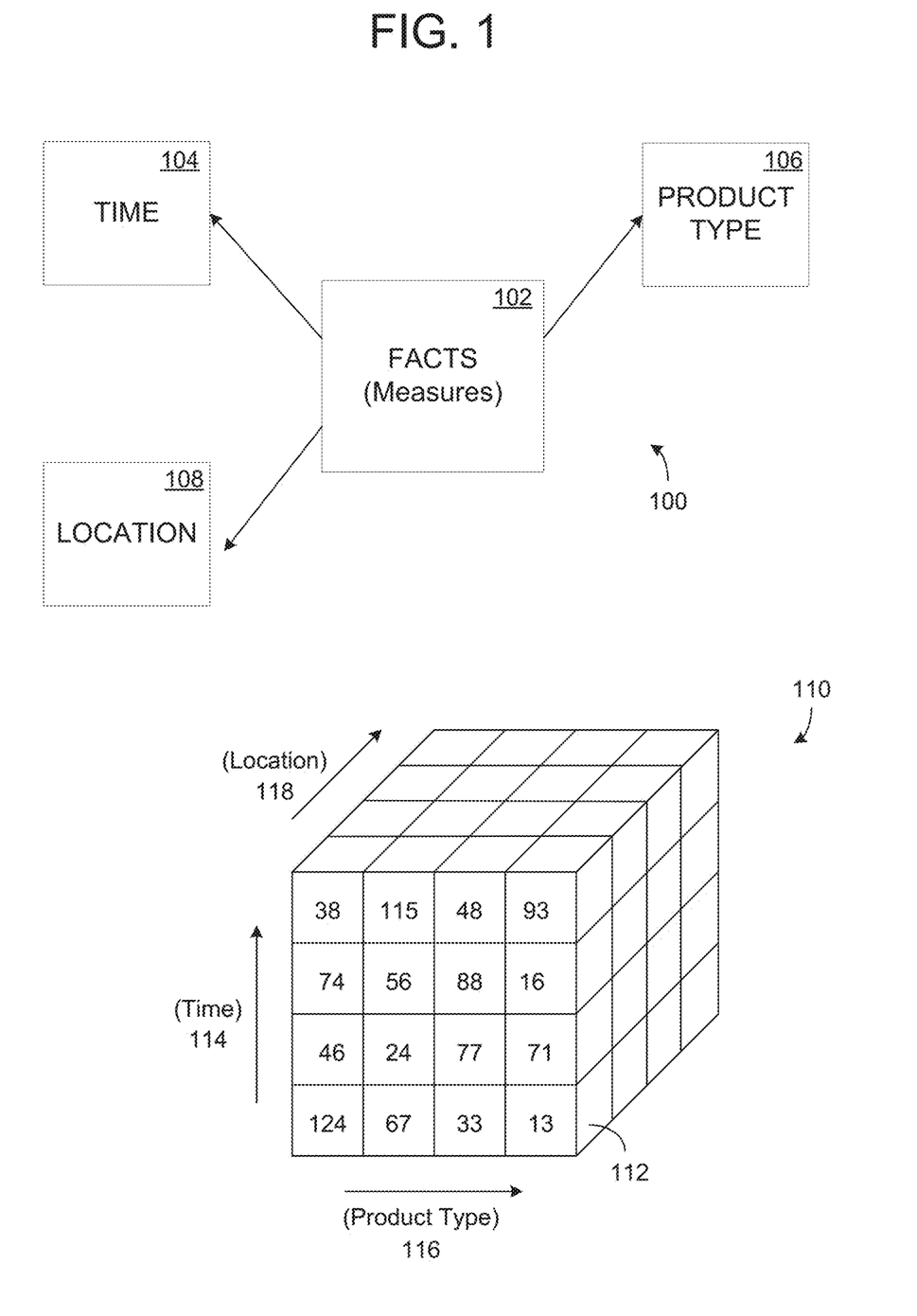
FIG. 1 is a diagram illustrating a multidimensional data model in accordance with an example embodiment.

FIG. 1 illustrates multidimensional data model in accordance with an example embodiment. Referring to FIG. 1, a multidimensional data set 100 includes a set of facts 102 that include different attributes 104, 106, and 108. In this case, the attributes 104, 106, and 108, can be used to model the data in a multidimensional model 110 which includes dimensions 114, 116, and 118, corresponding to attributes 104, 106, and 108, respectively. The result is the multidimensional model 110 that has a cubic structure, often referred to as cubes. The cube is broken up into a bunch of smaller cubes (cells 112) based on the different hierarchies of attributes included in the dimensions 114, 116, and 118.

Also, the data may be aggregated using different aggregation functions to generate features from the multidimensional data. For example, Sales may be summed from the last year to generate a feature of sales for the year. As another example, Sales may be aggregated for the past 5 years, then averaged per year, to determine the average sales per year for the last 5 years. The data becomes even more specific when a specific location and a specific product are specified. For example, sales of shoes at the store located in Raleigh, NC involves slicing out data from a subset of the cubic structure shown in FIG. 1.

Figure 2A:
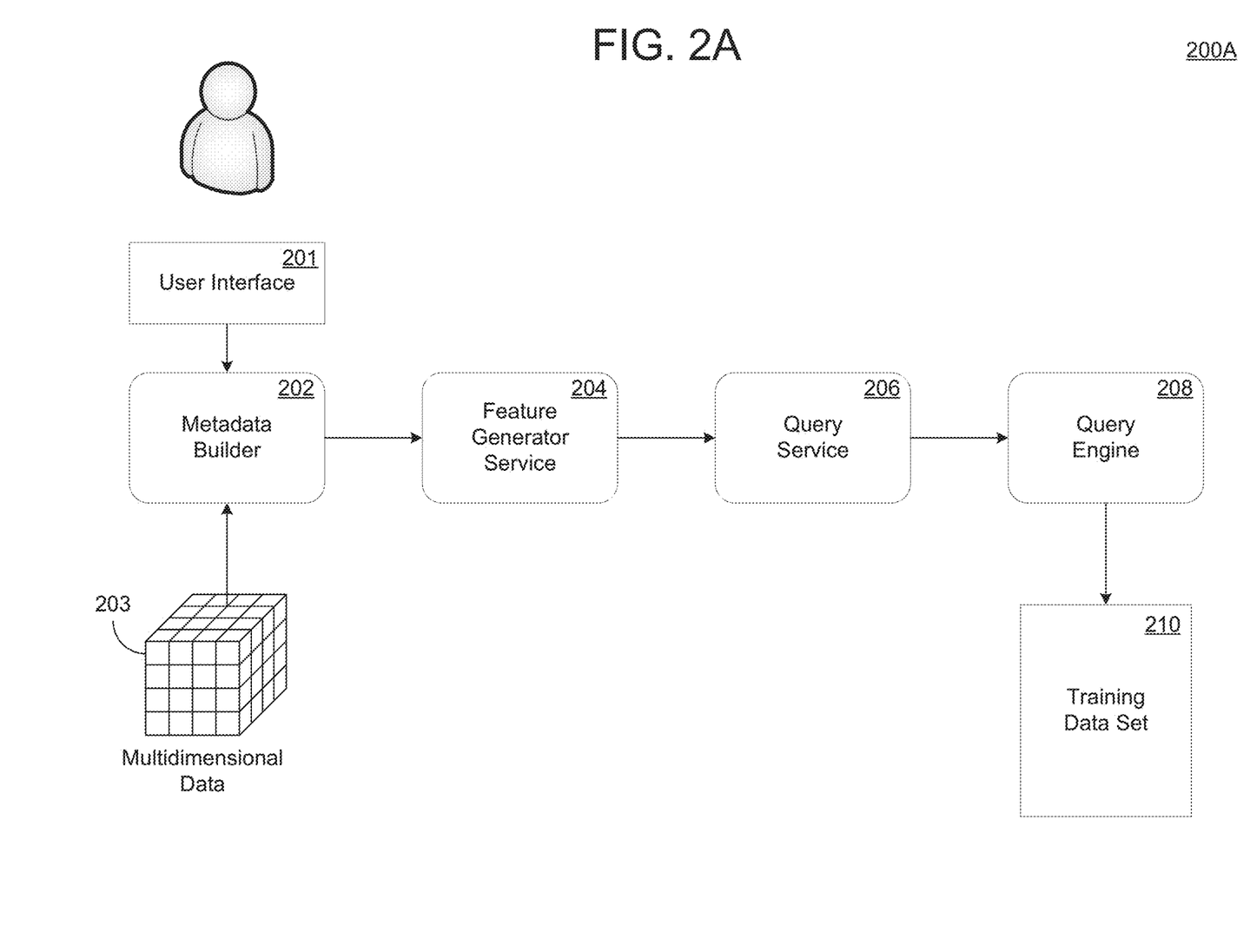
FIG. 2A is a diagram illustrating an architecture of an automated feature engineering system for multidimensional data, in accordance with an example embodiment.
Figure 2B:
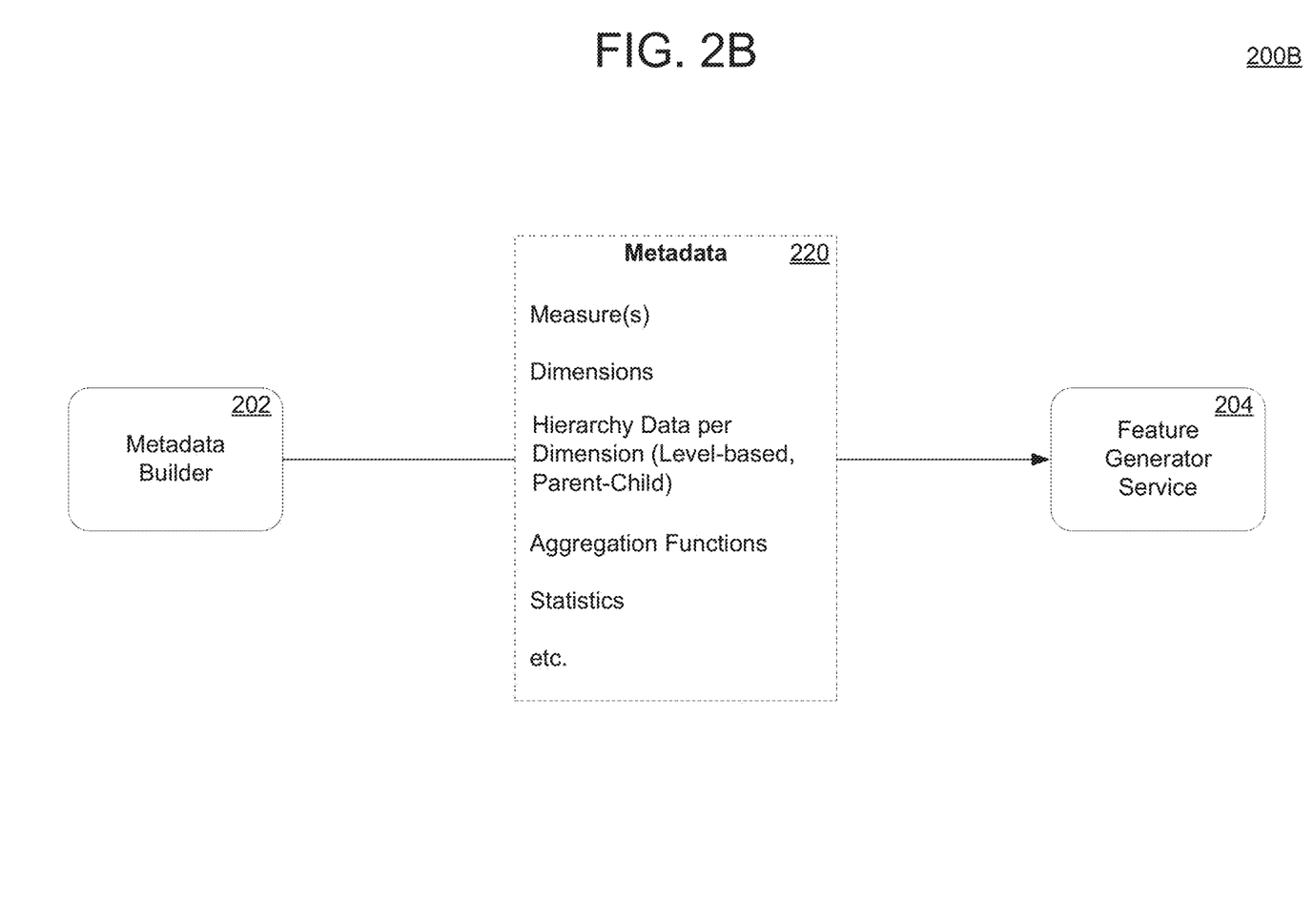
FIG. 2B is a diagram illustrating a process of building a metadata model that is extracted from multidimensional data in accordance with example embodiment.
Figure 2C:
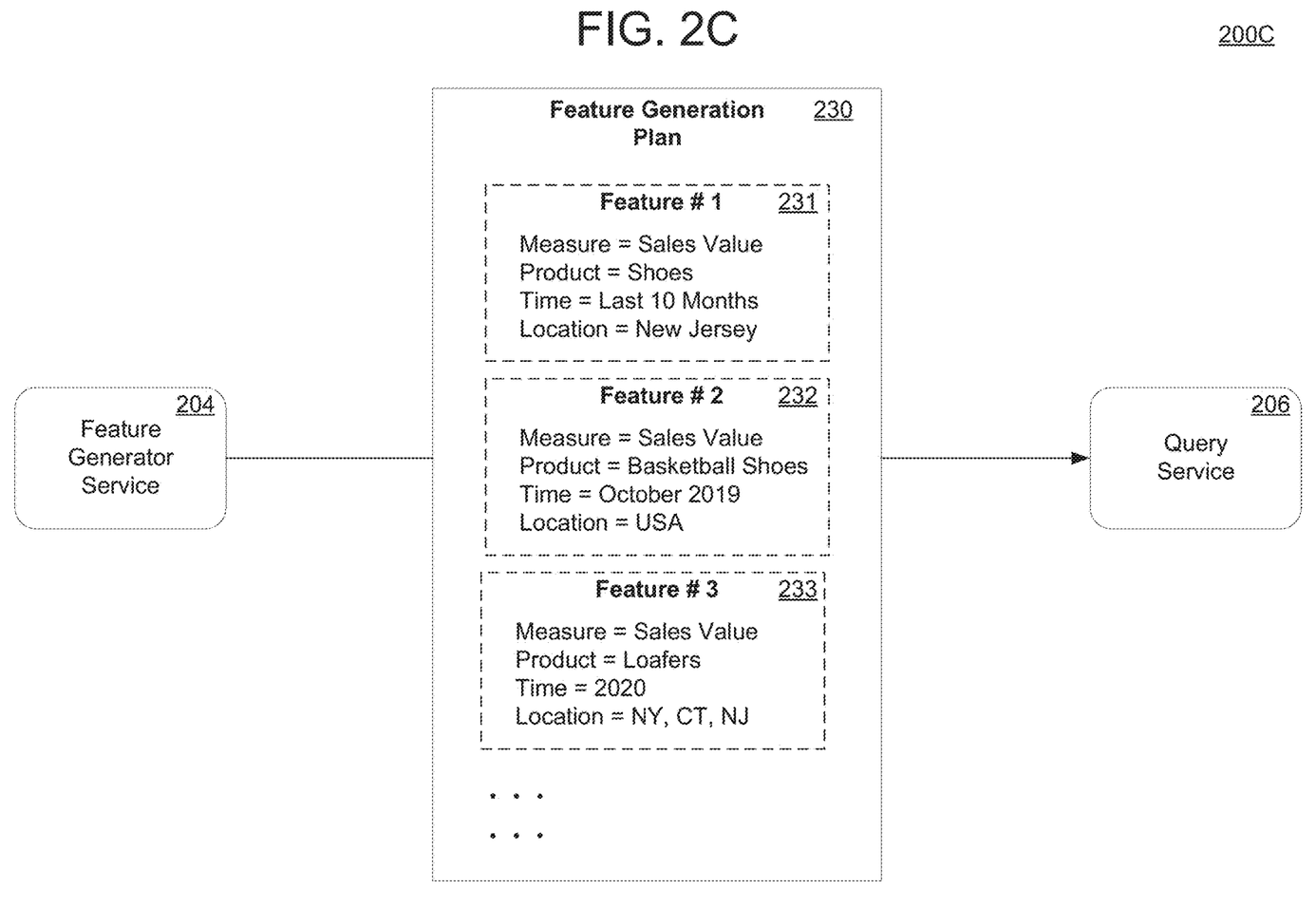
FIG. 2C is a diagram illustrating a process of generating a feature generation plan based on the extracted metadata in accordance with an example embodiment.
Figure 2D:
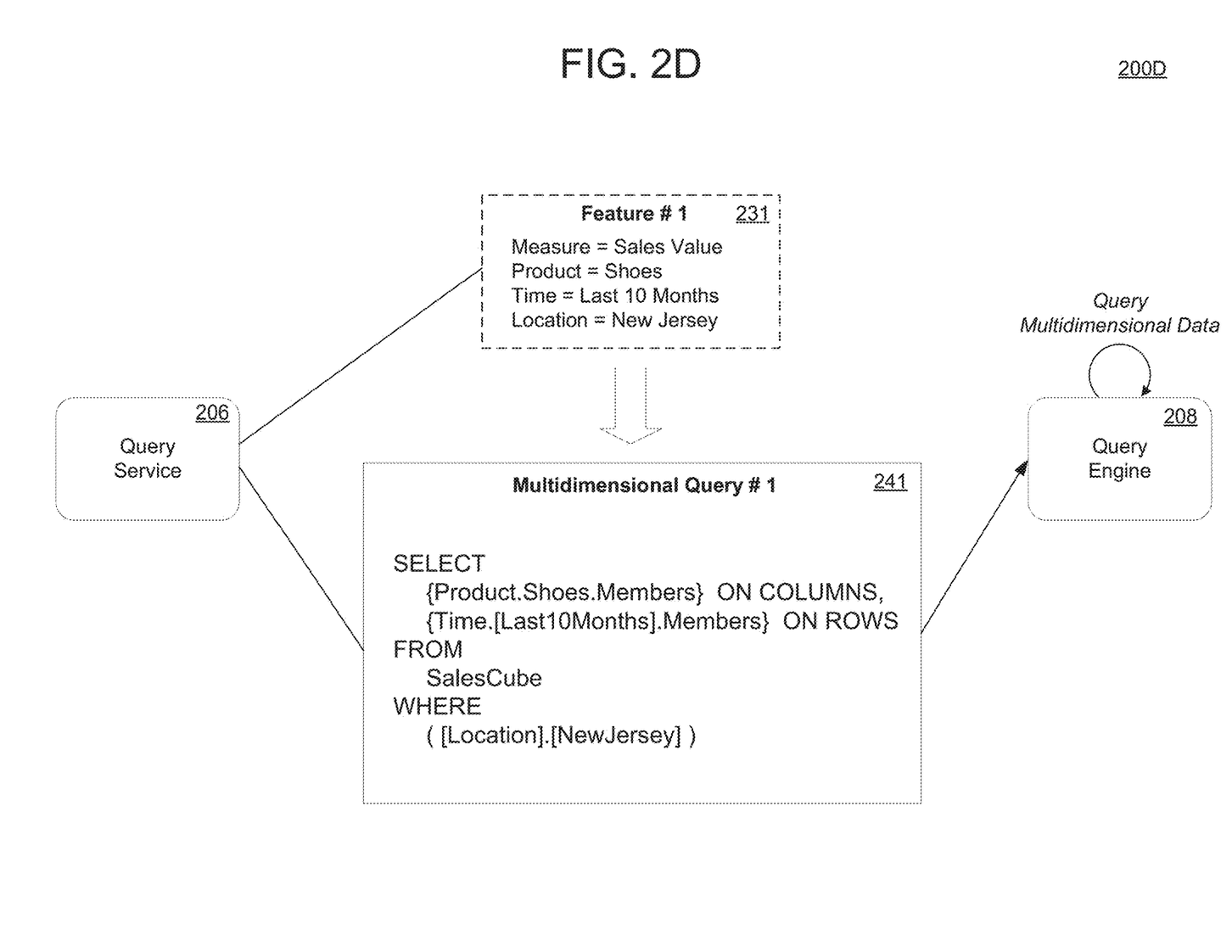
FIG. 2D is a diagram illustrating a process of querying multidimensional data based on the generated feature plan in accordance with an example embodiment.
Figure 3:
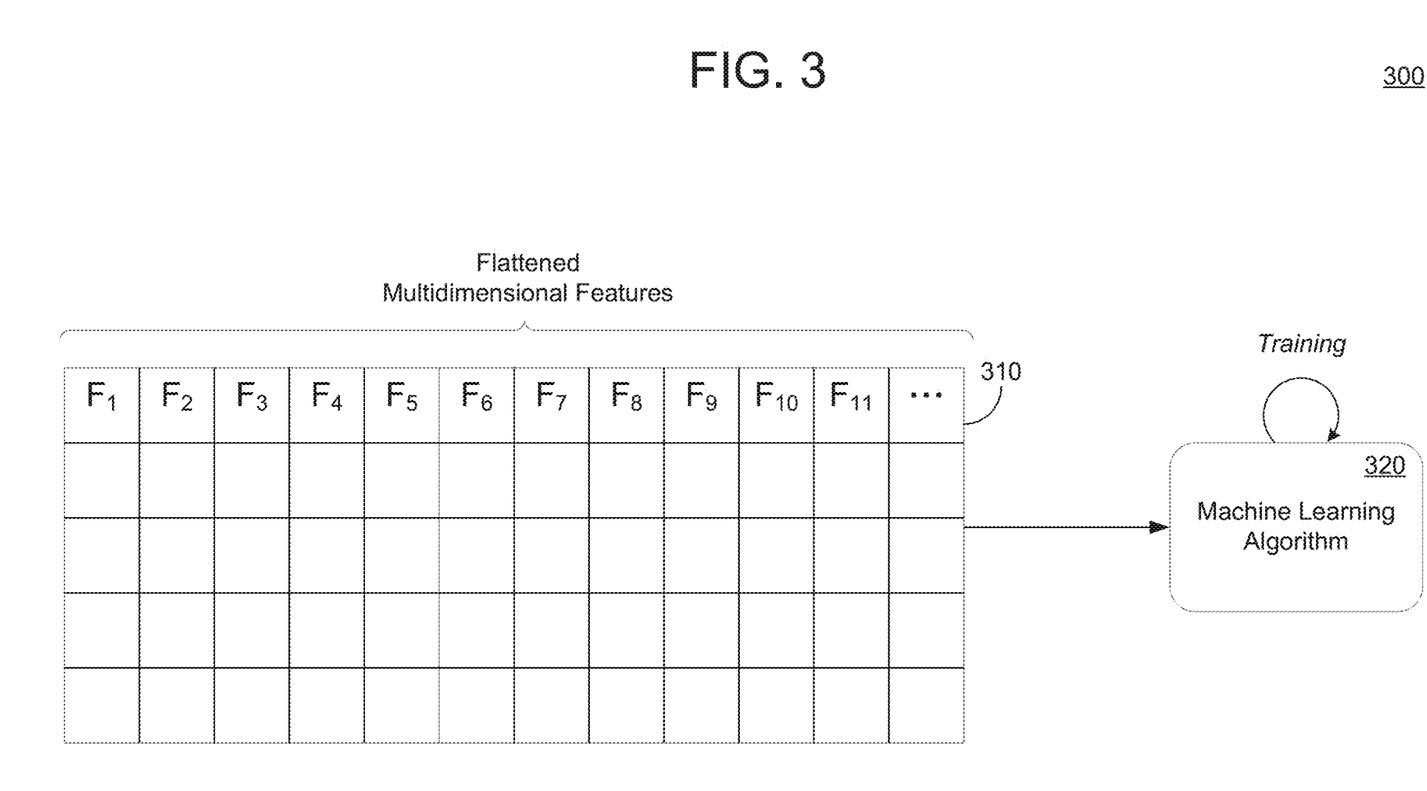
FIG. 3 is a diagram illustrating a two-dimensional feature set automatically generated from multidimensional data in accordance with an example embodiment.

As further described in the examples of FIGS. 2A-2D, features can be derived from the multidimensional data model and converted into a flat format/structure such as shown in the example of FIG. 3. These features can be used to train a predictive model such as a machine learning algorithm (e.g., classification, regression, neural network, etc.)

FIG. 2A illustrates an architecture of an automated feature engineering system 200A for multidimensional data, in accordance with an example embodiment. Referring to FIG. 2A, the system 200A may include a metadata builder 202 which is capable of extracting metadata from a multidimensional data 203. For example, the metadata may include measures, dimensions, hierarchical attributes of the measures, aggregation functions, and the like which are stored in metadata of a file or other storage item including the multidimensional data 203. In some embodiments, a user (e.g., via a user computing device) may connect to a user interface 201 of the system 200A and set limitations on data that is to be engineered. For example, the user may limit how far back in time the features go, the geographic locations that are considered, the product types that are considered, the regions that are considered, etc. Thus, the search space may be reduced to a more manageable search space.

The metadata and other statistics may be transmitted to a feature generation service 204 which can generate a feature generation plan. For example, the feature generation plan may include the possible features capable of being generated from the multidimensional data 203. As another example, the feature generation plan may include filters placed on the multidimensional data in any of the dimensions such that only specific hierarchies, levels, etc., of the data are extracted.

As an example, a quantity of shirts that are sold may be limited to a specific type of shirt in a first dimension (e.g., polo shirt). Other filters that may be added by a user include a specific time of the sales (e.g., after 2018), a specific region (e.g., East Coast of USA), and the like. The feature generation service 204 may create a plurality of features to be extracted. Here, the feature generation service 204 may create an information description of the feature that identifies the content. Continuing with the previous example, one feature may include a number of polo shirts that are sold between October and November of the year 2019 at the store located in New Canaan, CT. Many other features are also possible, as will be understood by one of ordinary skill in the art. Also, summations are not the only aggregation functions that can be used. Other examples of aggregation functions include, but are not limited to, minimum, maximum, count, distinct count, average, and the like.

The feature generation plan may be transmitted from the feature generation service 204 to a query system which may include a query service 206 and/or a query engine 208. In this example, the query service 206 converts the informal features in the feature generation plan into formal multidimensional queries that can be used to query a database storing the multidimensional data model 203. For example, the query service 206 may convert an information feature into proper query syntax (e.g., MDX syntax or the like) and executed by the query engine 208 (e.g., an OLAP engine, or the like). The results from the querying may include a list of features in a flat format (i.e., two-dimensional not multidimensional). For example, a feature may be a column with one or more rows (e.g., a plurality of rows) representing a plurality of values of the measure. The query engine 208 may store the results in a training data set 210 which may be a table, a file, a document, etc., within a data storage device. The training data set 210 may be input into a machine learning algorithm during a training of the machine learning algorithm.

In this example, the metadata builder 202, the feature generation service 204, the query service 206, and the query engine 208 may be embedded within a software application or a combination of software modules that are running on a hardware device such as a server, a database, a cloud platform, a user device, or the like. In some embodiments, the metadata builder 202, the feature generation service 204, the query service 206, and the query engine 208 may be replaced with or otherwise controlled by a processor such as a hardware processing device.

FIG. 2B illustrates a process 200B of building a metadata model 220 that is extracted from multidimensional data by the metadata builder 202, in accordance with example embodiment. Here, the metadata model 220 is provided to the feature generation service 204. Referring to FIG. 2B, the metadata model 220 may include a description of measures included within the multidimensional data. Measures include numeric values that can have aggregation functions applied thereto. The aggregation function enables the measure to be summarized along dimension hierarchies. In some embodiments, the measure may have a unit, a currency, or other attribute. The metadata model 220 may also include dimensions of the measure. The dimensions include attributes that describe the measure. For example, if the measure is measuring sales of a product, the dimensions may include attributes such as product name, product category, size, color, store location, geographic region, time, etc. The dimensions may be values that are hierarchical in nature. For example, the dimension of geographical region may include a hierarchy such as Country 4 Region 4 City 4 Town, etc. As another example, the dimension of time may include a hierarchy such as Year 4 Quarter 4 Month 4 Week 4 Day, etc.

In addition to the measures and the dimensions, the metadata model 220 may include identifications of the aggregation functions that can be applied to the measure along one or more of the dimensions. Aggregation functions include summation, minimum, maximum, count, distinct count, average, etc. The metadata model may also include additional statistics about the data that can provide additional insight. Furthermore, in some embodiments, the metadata may include restrictions or other filters that have been added to the feature generation process by a user. For example, restrictions may be placed on which dimensions to use, which portions of which dimension to use, time restrictions, location restrictions, etc.

FIG. 2C illustrates a processor 200C of generating a feature generation plan 230 that is generated by the feature generation service 204 based on the extracted metadata model 220 in accordance with an example embodiment. Referring to FIG. 2C, the feature generation service 204 may receive the metadata model 220 from the metadata builder 202 and any limitations or filters imposed by a user (e.g., via user interface 201) on the feature generation process. Here, the feature generation service 204 may identify possible features that can be generated based on the measure(s), dimensions, hierarchies, aggregation functions, etc., and generate a list of statements 231, 232, 233, etc. of features that are to be extracted from the multidimensional data 203. The list of statements may be stored in the feature generation plan 230.

For example, the declarative statements 231, 232, 233 may identify a measure, and attributes of one or more of dimensions such as levels within the hierarchies/granularity of the dimension, periods of data, specific locations, etc. The declarative statements 231, 232, and 233 may identify a dimension and its corresponding hierarchical value(s) to be used during the feature generation process.

The feature generation plan 230 includes informal declarative statements about what features to generate. The feature generation service 204 may also incorporate pivoting into the features. For example, a measure such as Sales Value can include year level, quarter level, daily level, etc., and the feature generation service 204 can pivot at different levels. Here, the feature generation service 204 may generate a feature for sales value for a current year, last year, two years before, etc. As another example, the feature generation service 204 may go into more detail and add sales for the 5 previous months, or 10 previous days. These different levels of granularity are referred to as pivoting. Pivoting can be done in different dimensions. In addition, the feature generation service 204 can pivot across multiple dimensions.

In some embodiments, the feature generation service 204 may generate features with different aggregation functions, different pivots around hierarchies, different periods of time, different scaler transformations, and the like. In addition, the feature generation service 204 may maintain a lineage of the generated features. The feature generation service 204 can select and drive custom features, select transformations (aggregations), select depths within the hierarchies, time granularities, and the like.

For example, the feature generation service 204 may generate features that can perform period-over-period comparisons. Between last month and this month there is an increase in 10%. Between this year and last year this is a different in −25%, etc. The feature generation service 204 can also incorporate order transformations (e.g., when date values are in the system, but the user is not interested in the date itself but rather whether the measure is recent, a long time ago, etc. This is transforming the data by computing a difference between the date and a reference date. The feature generation service also keeps the lineage of the features which helps explain the most impactful features. What contributes to the good model performance is these features. The system keeps the lineage if there are transformations that comprise multiple transformations. The lineage data may include a description of what data went into the transformation, and how it was transformed. In some embodiments, may be applied to reduce the feature space that the system can use in default. But it is also helpful to have the user provide some limitations to help reduce the feature space. Thus, the user can specify dimensions/granularities to include/exclude.

FIG. 2D illustrates a process 200D of querying multidimensional data based on the generated feature plan 230 in accordance with an example embodiment. Referring to FIG. 2D, the query service 206 may convert the declarative statements 231, 232, and 233 in the feature generation plan into a format of a multidimensional query using query syntax such as SELECT, FROM, WHERE, and the like. Here, the query service 206 may read the declarative statement 231 and build a multidimensional query 241 in a query syntax format such as MDX, or the like, that can be processed by a multidimensional query engine 208. The conversion may include changing the information descriptions of the features in the declarative statement 231 into predefined query statement syntax in the multidimensional query 241.

The query engine 208 shown in FIG. 2D may execute the multidimensional queries (including query 241) against the multidimensional data model 203 to generate flat two-dimensional features in the process 300 shown in FIG. 3. In this example, a multidimensional query executed by the query service engine 208 results in a new feature 310 being added to a list of features in tabular format. In this example, features ($F_1$, $F_2$, $F_3$, etc.) are respective columns with a plurality of values (rows). Here, the features 310 may be referred to as a predictive data set which can be used to train a machine learning algorithm 320.

Figure 4:
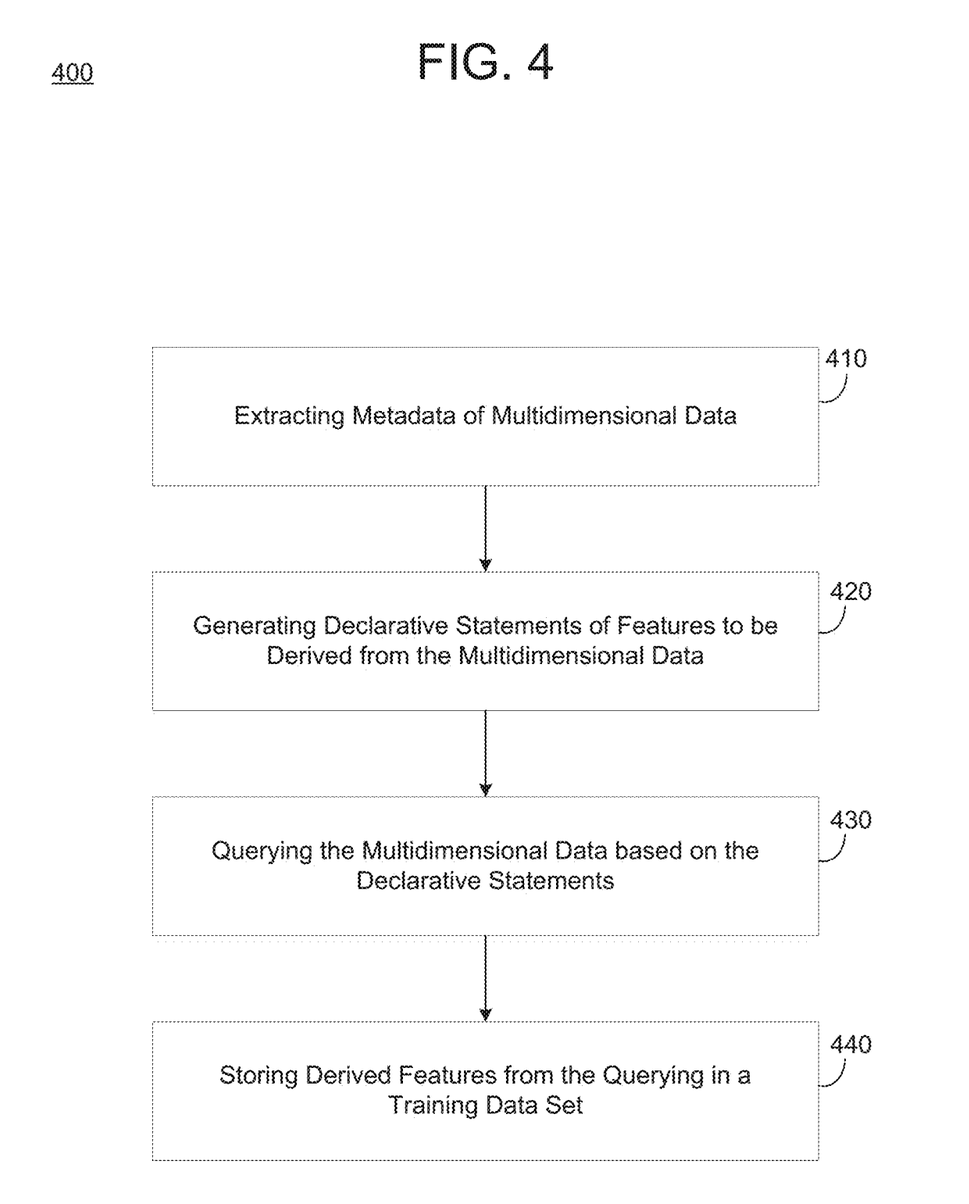
FIG. 4 is a diagram illustrating of a method of automated feature engineering for multidimensional data in accordance with an example embodiment.

FIG. 4 illustrates a method 400 of automated feature engineering for multidimensional data in accordance with an example embodiment. For example, the method 400 may be performed by a database node, a cloud platform, a server, a computing system (user device), a combination of devices/nodes, or the like. Referring to FIG. 4, in 410, the method may include extracting metadata of multidimensional data. When multidimensional data is added to the database (or other storage system), a user/uploader of the multidimensional data may be required to provide various attributes of the multidimensional data including hierarchies of the different dimensions, available aggregation functions, measures captured by the data, and the like. The attributes may be stored in metadata area of a file or other storage used to store the multidimensional data. This data may be extracted from the file/storage during conversion of the multidimensional data into features.

In some embodiments, the extracting may include building a metadata model based on a hierarchical structure of the multidimensional data which includes hierarchies of dimensions and aggregation functions available for the dimensions. In some embodiments, the multidimensional data may include a measure of data that includes at least three different dimensions where one dimension among the at least three dimensions is time.

In 420, the method may include generating declarative statements of features that are to be derived from the multidimensional data based on hierarchical attributes of the multidimensional data which are identified from the extracted metadata. For example, the declarative statements may include informally expressed statements which are not in query format but which identify the content of the features to be queried. For example, a declarative statement may identify a measure, a hierarchy (level, child, etc.), a pivot (period of data), and the like. These identifiers are not in a specific query language format, but are meant to informally represent the attributes to be queried for a feature.

For example, the generating may include generating the declarative statements based on at least one of parent-child hierarchies and level-based hierarchies of a dimension included in the multidimensional data. For example, a level-based hierarchy allows the data to be further drilled down into such as Years→Months→Weeks→Days→Hours, etc. Meanwhile, a parent-child hierarchy includes data that can be categorized into different smaller categories. For example, shoes may be partitioned into loafers, sneakers, sandals, high heels, etc. In some embodiments, a declarative statement may identify a hierarchical value for one or more of the dimensions of data from a plurality of dimensions of the multidimensional data and an aggregation function to be applied to the hierarchical value. In some embodiments, the declarative statement may identify a pivot about a dimension from among the plurality of dimensions. As a non-limiting example, the time dimension may be pivoted about (e.g., the last 3 months, the previous 15 days, between September and December of last year, etc.)

In 430, the method may include querying, via a query engine, the multidimensional data based on the generated declarative statements to generate the derived features. For example, the query engine (e.g., a query service of the query engine) may convert the information statements of the query generation plan into formal multidimensional query syntax (e.g., MDX, or the like). The query engine may use the multidimensional queries to query the multidimensional data and return a flat data set (e.g., in table format with rows and columns) where a column corresponds to a derived feature. In 440, the method may include storing the derived features in a training data set.

In some embodiments, the querying comprises converting the declarative statements into query operations capable of being executed by the query engine against the multidimensional data. In some embodiments, the querying may include generating a plurality of columns representing a plurality of derived features, and the storing comprises storing the plurality of columns in a table to create the training data set.

Figure 5:
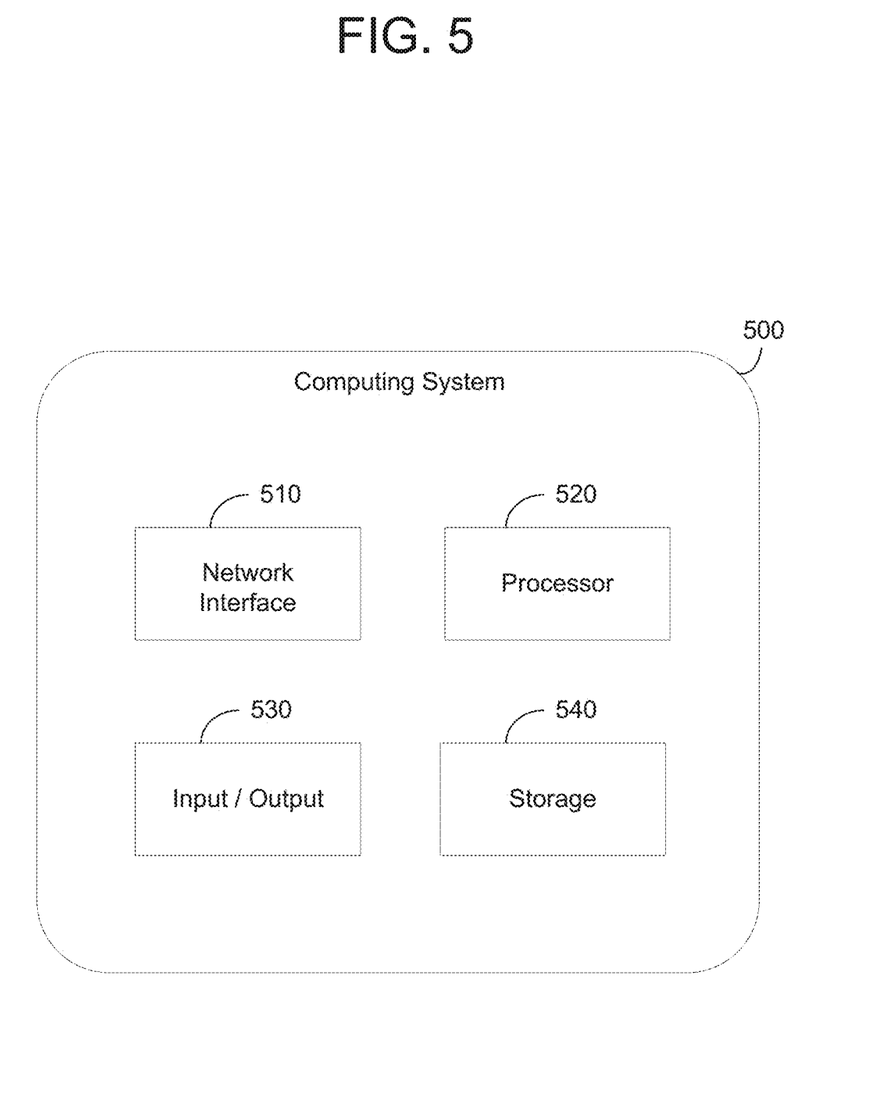
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 5. According to various embodiments, the storage 540 may include a data store that stores data in one or more formats such as a multidimensional data model, a plurality of tables, partitions and sub-partitions, and the like. The storage 540 may be used to store database records, items, entries, and the like.

According to various embodiments, the processor 520 may be configured to extract metadata of multidimensional data, generate declarative statements of features that are to be derived from the multidimensional data based on hierarchical attributes of the multidimensional data which are identified from the extracted metadata, and query, via a query engine, the multidimensional data based on the generated declarative statements to generate the derived features. For example, the processor 520 may be configured to perform any of the functions outlined above with respect to FIGS. 2A-2D, 3, and 4. The storage 540 may be configured to store the derived features in a training data set.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a processor configured to:
   process a user input received from a user interface, the user input indicating defined hierarchical levels of data to be extracted from multidimensional data;
   extract metadata of the multidimensional data stored in a data store:
   generate a feature plan that comprises a plurality of declarative statements with informal descriptions of a plurality of different features to extract from the multidimensional data based on different aggregation functions included in the extracted metadata, wherein the feature plan includes filters placed on the multidimensional data such that extracted information from the multidimensional data is limited to the defined hierarchical levels of data, each of the declarative statements being generated automatically based on the extracted metadata, each of the declarative statements identifying a measure, attributes of one or more dimensions within the defined hierarchical levels of data, and time periods of the data, at least one or the declarative statements including pivots at different levels of granularity;
   convert the plurality of declarative statements within the feature plan into a plurality of multidimensional expressions by changing the informal descriptions of features into multidimensional query syntax;
   automatically generate a query and execute the query of the multidimensional data based on the plurality of multidimensional expressions to generate a plurality of derived features; and
   execute a machine learning model and input the plurality of derived features to the machine learning model during execution.

2. The computing system of claim 1, wherein each informal declarative statement comprises informal descriptions of features including a respective measure and a respective hierarchical level of a dimension of the multidimensional data.

3. The computing system of claim 1, wherein the processor is further configured to identify a plurality of different aggregation functions available for a dimension among at least three dimensions in the multidimensional data based on the metadata, and generate the feature plan based on the plurality of different aggregation functions for the dimension.

4. The computing system of claim 1, wherein the multidimensional data comprises at least three dimensions, and the processor is configured to generate the plurality of derived features in two-dimensions and store the plurality of derived features within a two-dimensional data structure.

5. The computing system of claim 1, wherein the processor is further configured to build a metadata model based on a hierarchical structure of the multidimensional data and generate the plurality of declarative statements based on the metadata model, wherein the metadata model comprises a hierarchy between a plurality of values of a dimension of data from among the multidimensional data.

6. The computing system of claim 1, wherein each declarative statement from among the plurality of declarative statements is generated with an identifier of a measure, an identifier of a dimension, and an identifier of a hierarchy of data to be queried.

7. The computing system of claim 1, wherein the processor is configured to receive feature data from a user via a user interface, generate a declarative statement with a filter placed on it based on the feature data received from the user, and add the generated declarative statement to the feature plan.

8. The computing system of claim 1, wherein the processor is configured to replace the plurality of declarative statements within the feature plan with multidimensional expression query syntax prior to querying the multidimensional data.

9. A method comprising:
   processing a user input received from a user interface, the user input indicating defined hierarchical levels of data to be extracted from multidimensional data stored in a data store;
   extracting metadata of the multidimensional data;
   generating a feature plan that comprises a plurality of declarative statements with informal descriptions of a plurality of different features to extract from the multidimensional data based on different aggregation functions included in the extracted metadata, wherein the feature plan includes filters placed on the multidimensional data such that extracted information from the multidimensional data is limited to the defined hierarchical levels of data, each of the declarative statements being generated automatically based on the extracted metadata, each of the declarative statements identifying a measure, attributes of one or more dimensions within the defined hierarchical levels of data, and time periods of the data, at least one or the declarative statements including pivots at different levels of granularity;

converting the plurality of declarative statements within the feature plan into a plurality of multidimensional expressions by changing the informal descriptions of features into multidimensional query syntax;

automatically generating a query and executing the query of the multidimensional data based on the plurality of multidimensional expressions to generate a plurality of derived features; and executing a machine learning model and inputting the plurality of derived features to the machine learning model during execution.

10. The method of claim 9, wherein each informal declarative statement comprises informal descriptions of features including a respective measure and a respective hierarchical level of a dimension of the multidimensional data.

11. The method of claim 9, wherein the method further comprises identifying a plurality of different aggregation functions available for a dimension among at least three dimensions in the multidimensional data based on the metadata, wherein the generating comprises generating the feature plan based on the plurality of different aggregation functions for the dimension.

12. The method of claim 9, wherein the multidimensional data comprises at least three dimensions, and the generating comprises generating the plurality of derived features in two-dimensions and storing the plurality of derived features within a two-dimensional data structure.

13. The method of claim 9, wherein the method further comprises building a metadata model based on a hierarchical structure of the multidimensional data and generating the plurality of declarative statements based on the metadata model, wherein the metadata model comprises a hierarchy between a plurality of values of a dimension of data from among the multidimensional data.

14. The method of claim 9, wherein each declarative statement from among the plurality of declarative statements is generated with an identifier of a measure, an identifier of a dimension, and an identifier of a hierarchy of data to be queried.

15. The method of claim 9, wherein the method further comprises receiving feature data from a user via a user interface, generating a declarative statement with a filter placed on it based on the feature data received from the user, and adding the generated declarative statement to the feature plan.

16. The method of claim 9, wherein the converting comprises replacing the plurality of declarative statements within the feature plan with multidimensional expression query syntax prior to querying the multidimensional data.

17. A non-transitory computer-readable medium comprising instructions which when executed by a processor cause a computer to perform a method comprising:

processing a user input received from a user interface, the user input indicating defined hierarchical levels of data to be extracted from multidimensional data stored in a data store;

extracting metadata of the multidimensional data;

generating a feature plan that comprises a plurality of declarative statements with informal descriptions of a plurality of different features to extract from the multidimensional data based on different aggregation functions included in the extracted metadata, wherein the feature plan includes filters placed on the multidimensional data such that extracted information from the multidimensional data is limited to the defined hierarchical levels of data, each of the declarative statements being generated automatically based on the extracted metadata, each of the declarative statements identifying a measure, attributes of one or more dimensions within the defined hierarchical levels of data, and time periods of the data, at least one or the declarative statements including pivots at different levels of granularity;

converting the plurality of declarative statements within the feature plan into a plurality of multidimensional expressions by changing the informal descriptions of features into multidimensional query syntax;

automatically generating a query and executing the query of the multidimensional data based on the plurality of multidimensional expressions to generate a plurality of derived features; and executing a machine learning model and inputting the plurality of derived features to the machine learning model during execution.

18. The non-transitory computer-readable medium of claim 17, wherein each informal declarative statement comprises informal descriptions of features including a respective measure and a respective hierarchical level of a dimension of the multidimensional data.

19. The non-transitory computer-readable medium of claim 17, wherein the method further comprises identifying a plurality of different aggregation functions available for a dimension among at least three dimensions in the multidimensional data based on the metadata, wherein the generating comprises generating the feature plan based on the plurality of different aggregation functions for the dimension.

20. The non-transitory computer-readable medium of claim 17, wherein the multidimensional data comprises at least three dimensions, and the generating comprises generating the plurality of derived features in two-dimensions and storing the plurality of derived features within a two-dimensional data structure.

\* \* \* \* \*